United States Patent
Riebs et al.

(10) Patent No.: US 9,612,805 B2
(45) Date of Patent: Apr. 4, 2017

(54) RAPID MOBILE APP GENERATOR

(71) Applicant: SAP SE, Walldorf (DE)

(72) Inventors: Florian Riebs, Karlsruhe (DE); Rudolf Niessen, Speyer (DE); Alexander Mezler, Sinsheim (DE)

(73) Assignee: SAP SE, Walldorf (DE)

( * ) Notice: Subject to any disclaimer, the term of this patent is extended or adjusted under 35 U.S.C. 154(b) by 19 days.

(21) Appl. No.: 14/722,480

(22) Filed: May 27, 2015

(65) Prior Publication Data

US 2016/0350083 A1 Dec. 1, 2016

(51) Int. Cl.
*G06F 9/44* (2006.01)
*G06F 3/0484* (2013.01)

(52) U.S. Cl.
CPC ............ *G06F 8/34* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 5,754,858 A * | 5/1998 | Broman | ............... | G06F 8/38 717/111 |
| 5,966,532 A * | 10/1999 | McDonald | ............ | G06F 8/34 707/999.101 |
| 6,053,951 A * | 4/2000 | McDonald | ............ | G06F 8/34 717/109 |
| 7,562,347 B2 * | 7/2009 | Baumgart | ............ | G06F 8/38 717/107 |
| 7,624,372 B1 * | 11/2009 | Stewart | ............ | G06F 8/34 717/106 |
| 8,091,071 B2 * | 1/2012 | Tsantilis | ............ | G06F 8/36 714/52 |
| 8,261,231 B1 * | 9/2012 | Hirsch | ............ | G06F 8/20 709/201 |
| 8,656,353 B2 * | 2/2014 | Brendza | ............ | G06F 8/38 717/109 |
| 8,694,968 B2 * | 4/2014 | Eteminan | ............ | G06F 8/20 717/103 |
| 8,719,776 B2 * | 5/2014 | Eteminan | ............ | G06F 8/20 717/106 |
| 8,832,644 B2 * | 9/2014 | Hirsch | ............ | G06F 8/20 717/107 |
| 8,856,729 B2 * | 10/2014 | Moore | ............ | G06F 8/38 715/700 |
| 8,966,438 B2 * | 2/2015 | Chamberlain | ............ | G06F 8/34 705/37 |
| 2004/0019875 A1 * | 1/2004 | Welch | ............ | G06F 9/4443 717/109 |
| 2004/0034847 A1 * | 2/2004 | Joffrain | ............ | G06F 8/70 717/113 |
| 2006/0064674 A1 * | 3/2006 | Olson, Jr. | ............ | G06F 8/38 717/113 |

(Continued)

*Primary Examiner* — Tuan Q. Dam
*Assistant Examiner* — Zheng Wei
(74) *Attorney, Agent, or Firm* — Schwegman Lundberg & Woessner, P.A.

(57) ABSTRACT

Various embodiments herein include one or more of systems, methods, software, and data structures that are utilized in mobile app generation and execution. Such embodiments provide access to functionality and data of non-mobile device applications within mobile device apps without having to expend resources to replicate non-mobile device applications in a mobile context.

17 Claims, 5 Drawing Sheets

(56) References Cited

U.S. PATENT DOCUMENTS

| | | | | |
|---|---|---|---|---|
| 2008/0046868 A1* | 2/2008 | Tsantilis | ............... | G06F 8/36 |
| | | | | 717/136 |
| 2011/0161912 A1* | 6/2011 | Eteminan | ............... | G06F 8/20 |
| | | | | 717/101 |
| 2012/0284686 A1* | 11/2012 | Sharrma | ............... | G06F 8/38 |
| | | | | 717/109 |
| 2013/0239086 A1* | 9/2013 | Brendza | ............... | G06F 8/38 |
| | | | | 717/109 |
| 2014/0109041 A1* | 4/2014 | Yunten | ............... | G06F 8/34 |
| | | | | 717/109 |
| 2014/0215434 A1* | 7/2014 | Kaneko | ............... | G06F 8/34 |
| | | | | 717/109 |
| 2015/0347096 A1* | 12/2015 | Hanna | ............... | G06F 8/36 |
| | | | | 717/107 |

\* cited by examiner

FIG. 3

RAPID MOBILE APP GENERATOR

BACKGROUND INFORMATION

Modern computing allows users to be connected at virtually any time in any place via mobile devices, such as smartphones, tablets, and smartwatches. Computing systems provide mobile users access to computing resources via web browsers and mobile device applications, commonly referred to as apps. However, developing browser-based applications and apps has required development of new systems and apps that replicate functionality of previously developed system functionality and often replication of data from backend systems to other data repositories that accessible in a mobile computing environment. This development of duplicative system access mechanisms and data repositories, and parallel maintenance thereof, is costly in terms of at least financial, time, and resources. Further, maintaining multiple access mechanisms adds additional complexity

BRIEF DESCRIPTION OF THE DRAWINGS

FIG. 3 illustrates an application user interface from which user interface elements are copied to a mobile app user interface being authored, according to an example embodiment.

DETAILED DESCRIPTION

Figure 1:
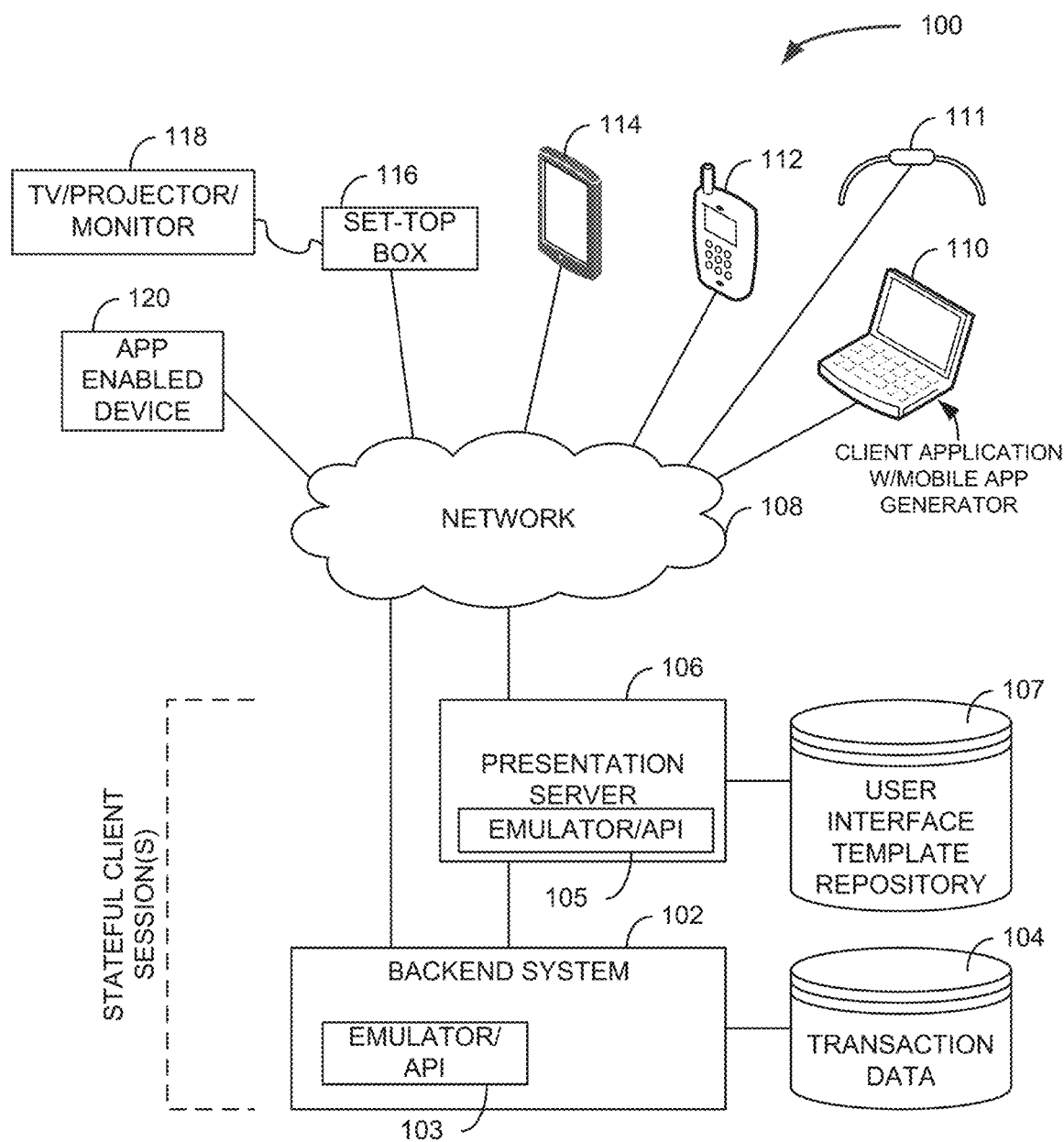
FIG. 1 is a logical block diagram of a system, according to an example embodiment.

Various embodiments herein include one or more of systems, method, software, and data structures that are utilized in mobile app generation and execution. Such embodiments provide access to functionality and data of non-mobile device applications within mobile device apps without having to expend resources to replicate non-mobile device applications in a mobile context. Some such embodiments can be considered as spanning three layers of a technical data processing infrastructure: 1) a backend data processing system of an enterprise, such as an enterprise resource planning (ERP), customer relationship management (CRM), a customer retail system such as may provide data processing functionality of such enterprise data processing systems, among other systems; 2) a presentation server that operates between the backend system and mobile devices of users or customers to maintain stateful network sessions there between, to leverage data and functionality of the enterprise systems including that of the backend system in providing access to the same on mobile devices; and 3) mobile devices that present interfaces to allow mobile interaction with data and functionality of the enterprise systems.

The mobile devices as described and illustrated herein include tablet computing devices, smartphones, handheld computing devices, smartwatches and the like. However, mobile devices may also include apps that execute within web browsers, set-top boxes that connect to televisions, monitors, projectors, and other display devices, smart controllers within automobiles or home appliances, and other devices that are enabled to execute apps.

As mentioned above, a presentation server operates between a backend system and mobile devices of users. The presentation server in such embodiments is enabled to communicate with processes of the backend system to establish stateful data processing sessions with the backend system upon request from apps that execute on mobile devices. The presentation server includes user interface templates stored thereon or accessible thereby. The user interface templates include definitions of user interface elements with each user interface element mapped to at least one of data and functionality of a non-mobile device user interface, such as may be defined elsewhere within a user interface of a non-mobile device. The user interface templates user interface definitions are defined in code, which may be encoded in a markup language such as eXtensible Markup Language (XML). In some embodiments, code of a user interface template is executable within the mobile device app. In other embodiments, a user interface template may include a portion that is consumed by the mobile device app to present a user interface and includes mappings to data and functions that execute within an execution environment on the presentation server or other server. Thus, in various embodiments, the code may be compiled or non-compiled code executable within one or more of the mobile device app, an execution environment of the mobile device app, and an execution environment of the backend system.

In some such embodiments, a user interface template is generated as a copy of a portion of a thick-client application, such as may be accessed on a personal computer. The user interface template may include one or more user interfaces that are copied from user interfaces of the thick-client application and include some or all of the user interface elements of the respective thick-client user interfaces. The user interface template user interfaces, in some embodiments, include links to the corresponding thick-client user interfaces. When the user interface template is accessed on a mobile device, the respective thick-client user interface(s) are invoked for execution within an emulator that executes on the presentation server or within the backend system. The user interface template user interface on the mobile device and the emulator maintain a stateful session there between. The stateful session is with regard to data from the user interface elements communicated to and presented by the user interface template on the mobile device. The stateful session is also with regard to input requests and commands received within a user interface presented on the mobile device communicated to the emulator where execution or fulfillment of the input requests and commands are executed and any results communicated by the emulator back to the mobile device. User interfaces of user interface templates in such embodiments can therefore be considered kind of a thick-client application stub tailored to a particular mobile device type or mobile device operating system type. At the same time, mobile device apps according to such embodiments provide an execution environment within which user interface templates may be presented to facilitate user interaction with data and functional elements that are executed through emulation on a networked computer.

The user interface templates may be stored in the presentation server, a template repository, or elsewhere. The user interface templates, in some embodiments, may be downloaded by a mobile device app on demand. The mobile device app may cache or otherwise store some or all retrieved user interface templates. In other embodiments, the user interface templates may be a part of the mobile device app or part of an update to the mobile device app.

As there are many different mobile device types with distinct display and interaction properties, functionality of a non-mobile device application, such as a personal computer application, may be the subject of multiple user interface templates of multiple mobile device apps. User interface templates may be tailored for each mobile device type or mobile device operating system on which a mobile device app may be deployed. As a result, mobile experiences may be tailored to provide user experiences specific to the mobile device a user may possess.

To date however, generating such tailored mobile device apps has been expensive in virtually all conceivable terms. Some embodiments herein include a mobile app generator that enables generation of tailored mobile device apps through relatively simple interaction with an existing non-mobile device application, such as an application that executes, or is interacted with, on a personal computer. Some such embodiments include placing the existing non-mobile device application in a recording mode, recording selections of and interactions with user interface elements of one or more user interfaces, transitions between user interfaces, and the like. From these recorded selections, a user interface template is then generated. A generated user interface template may then be published for use by mobile device apps or be customized, such as by adding or modifying code, prior to publishing.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 is an example computing environment within which various embodiments may be implemented.

The system 100 includes a backend system 102 of an enterprise, such as one or more of an enterprise resource planning (ERP), customer relationship management (CRM), human resources management (HRM), a transaction processing system, a customer retail system such as may provide multiple data views of various products offered by an enterprise, an order and order processing system, a banking system, and the like. The backend system 102 stores and processes transaction data 104 as may be stored in a database, data files, and other data storage processes and devices.

The backend system 102 may be deployed to one or more computing devices, such as one or more enterprise-class server computers, virtual machines, and the like. The backend system 102 may be accessed by other systems and programs that execute on various computing devices throughout the system 100. For example, the backend system 102 may be accessed via a network 108 by thick-client or thin-client applications as may be deployed to personal computers 110, by other software systems, and other clients. The backend system 102 may also be accessed by a presentation server 106 either directly or via the network 108.

As discussed above, the presentation server 106 operates in the networked environment of the system 100 between the backend system 102 and mobile devices 111, 112, 114, 116, 120 of users, although the presentation server 106 may also operate with web browser apps as may be deployed to web browser applications of personal computers 110 and other computing devices. The presentation server 106 in such embodiments communicates with processes of the backend system 102 to establish stateful data processing sessions with the backend system 102 upon request from apps that execute on mobile devices 111, 112, 114, 116, 120. The presentation server 106 may be deployed as an add-on module to the backend system 102 and operate on the same or different hardware thereof, in some embodiments. However, in other embodiments, the presentation server 106 may be deployed as a standalone program that executes on one or more distinct computing devices or virtual machines from the backend system 102. In some embodiments, the presentation server 106 is hosted by a third party, such as in a cloud-computing type arrangement.

The presentation server 106 includes user interface templates, stored in the presentation server 106, a template repository 107, or other network 108 storage location. The user interface templates include mappings between user interface elements renderable within a mobile device app and corresponding user interface elements, and associated data and functions thereof, within a thick-client application. When a user interface is rendered within a mobile device app according to a user interface template, the corresponding user interface from which the user interface template was generated is invoked within an emulator or Application Programming Interface (API) 103, 105 on one of the presentation server 106, and the backend system 102. The emulator/API 103, 105 is an execution environment within which the thick-client application is instantiated and executes, but there is visual rendering of a user interface based directly thereon. Instead, the user interface is a rendering within a mobile device app based on a user interface template. The user input is received within the rendering of the mobile user interface and communicated to the emulator/API 103, 105 and data is received in response for processing, which may include presenting, within the mobile user interface. Through such embodiments, the mobile device app is able to leverage previously implemented functionality, data, and data processing resources to facilitate a mobile deployment thereof. Further, such embodiments reduce cost in terms of at least financial, time, and resource consumption as existing resources are repurposed in the mobile context without requiring duplication through the leveraging of previously deployed solutions.

To generate a user interface template, a personal computer 110 user, typically a user having sufficient privileges, accesses the thick-client application an opens a user interface for which a user interface template is to be at least in part based upon. The user then enters a recording mode within the application, such as by selecting a menu option or entering a key combination on a keyboard. At this point, a secondary user interface may be presented by the application. The user then selects elements of the application user interface and copies of the selected user interface elements are placed within the secondary user interface.

The secondary user interface is a view of how a graphical user interface template will be rendered within a user interface of a mobile device app. Thus, as there are many different types of mobile devices having different properties, such as different display, input types and different operating systems, in some embodiments, the user may select a type of mobile device or mobile device app for which the user interface template being authored will be tailored. This selection may then cause the shape and size of the secondary window to be modified, or an outline of the size and shape of a viewable area on the target mobile device of the user interface template to be presented. The user may then move the user interface elements around and change display properties of the elements to format the user interface elements for the specific user interface template being authored. Each of the selected user interface elements copied to the secondary user interface includes data tying the specific user interface element back to the respective user interface element of the source application from which it was copied.

Selecting of the user interface elements may also include selection of user interface elements that trigger data processing activities, such as creating, retrieving, storing, updating, and deleting data, and even transitioning to another user interface. When transitioning to another user interface, the secondary user interface may be cleared of previously selected user interface elements to provide a clean user interface within which user interface elements of the next application user interface may be copied. Once the user has completed selecting user interface elements and arranging and modifying properties of the user interface elements within the secondary user interface, the user may remove the application from the recording mode. At this point, the user may choose to store the generated user interface template, test the user interface template within a mobile device emulator, and publish the user interface template for use by mobile device application. The publishing typically includes storing the user interface template to a network storage location from which mobile device apps can download the user interface template, such as the user interface template repository 107.

The user interface template, when stored, is encoded in a form that can be read and processed by the target mobile device app. This may include storing the user interface template in a markup language form, such as eXtensible Markup Language (XML), or in another form, such as ABAP or other computer coding language that can be read and executed by the mobile device app. In some embodiments, the user interface template may be encoded in XML and portions of the resulting XML file or other data structure may be encoded in ABAP.

The network 108 is generally a network capable of transporting data between computing devices of the various functional data processing elements of the system 100, such as the backend system 102, the presentation server 106, personal computers 110, and the various mobile devices 111, 112, 114, 116, 120. The network 108 may include both wired and wireless connections. The network 108 is intended to represent one or more of virtually any type of network capable of transporting data as described, such as one or more of a local area network, a wide area network, a system area network, a value added network, a virtual private network, the Internet, and other such networks.

Figure 2:
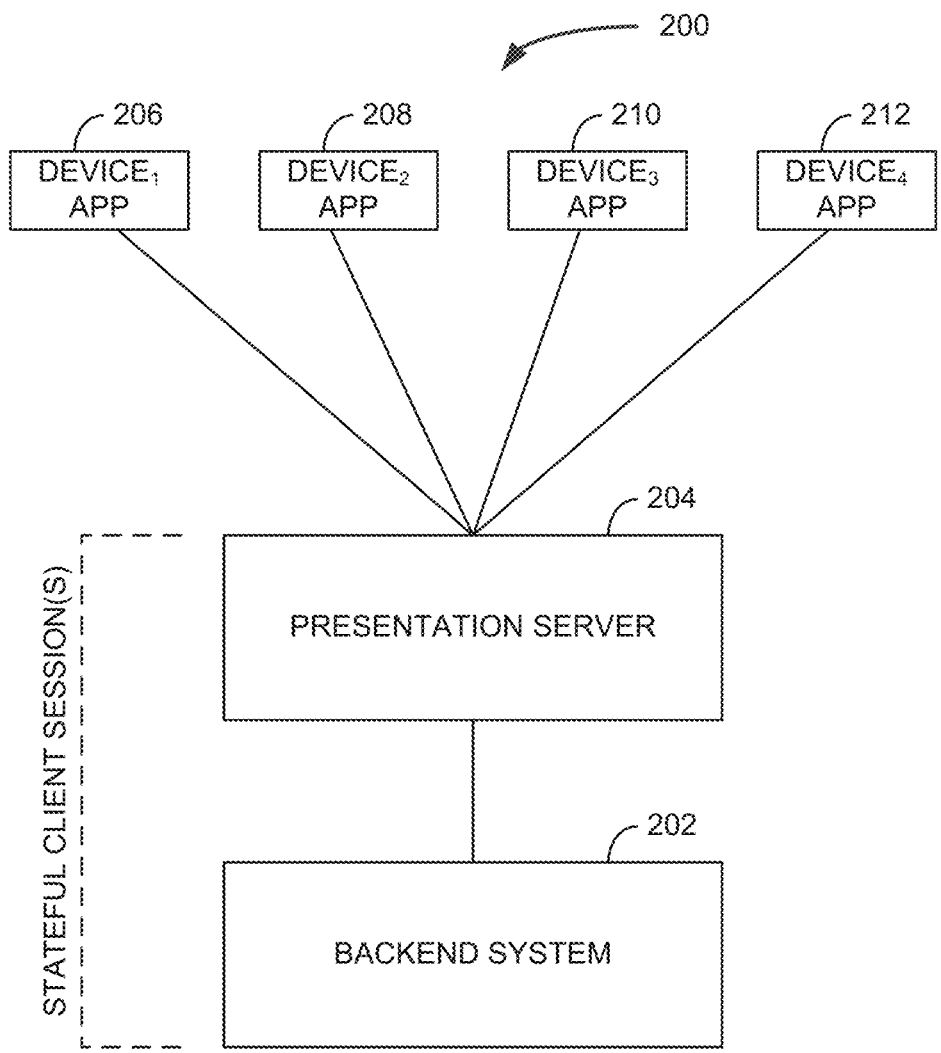
FIG. 2 is a logical block diagram of a system, according to an example embodiment.

FIG. 2 is a logical block diagram of a system 200, according to an example embodiment. The example embodiment includes a plurality of device apps$_{1-4}$ 206, 208, 210, 212. Although there are four device apps illustrated, other embodiments may include one, two, three, or more device apps. Each device app 206, 208, 210, 212 is generally an instance of the same app, although each device app 206, 208, 210, 212 is tailored for a different device-type, such as devices being different of one or more of different operating systems, different component types (e.g., operating system or version, display sizes and resolutions, input devices, processing power, bandwidth speeds, etc.), among other potential property differences.

As described above, each device app 206, 208, 210, 212 may include or have access to user interface templates to use in presenting data received from a presentation server 204. While the user interface templates include data defining how a user interface is to be rendered, user interface templates for a particular device type or configuration may not be available. Thus, in some embodiments, device apps 206, 208, 210, 212 may include tailoring options that may be manipulated by users, administrators, or otherwise to tailor a user interface template that was originally tailored for another mobile device type. The tailoring options may tailor specific user interface templates or may tailor user interface templates generally to allow for better presentation of data within user interface templates. For example, such tailoring may be performed to accommodate for a width or resolution of a display of a particular mobile device. Other tailoring may also, or alternatively, be provided for. Such tailoring options as may be set may be stored on a mobile device or other network location from which a device app 206, 208, 210, 212 may retrieve them.

The presentation server 204 operates between a backend system 202 and devices on which the device apps 206, 208, 210, 212 are deployed. The presentation server 204 communicates with processes of the backend system 202 to establish stateful data processing sessions with the backend system 202 upon request from one of the device apps 206, 208, 210, 212 when executing according to a user interface template. The presentation server 204 may store user interface templates, which may be stored in the presentation server 204 or a template repository, such as template repository 107 of FIG. 1. The user interface templates include renderable definitions of user interface elements and mappings between the user interface elements and user interface elements of a thick-client application that will be invoked within an emulator or API when the user interface template is viewed within a device app 206, 208, 210, 212. The emulator or API may execute on the presentation server 204, while in other embodiments the emulator or API may execute on the backend system 202 or other data processing resource.

The stateful data processing sessions between the presentation server 204 and the backend system 202 are maintained while a device app 206, 208, 210, 212 is viewing or manipulating data, although such sessions may timeout after a period of inactivity. The stateful data sessions are stateful in the sense that a presentation server may hold certain types of transactions open while awaiting further input from a device app 206, 208, 210, 212. For example, a stateful transaction session between a rendering of a user interface template within a device app 206, 208, 210, 212 and an emulated session within an emulator or API of a thick-client application user interface.

Figure 3:
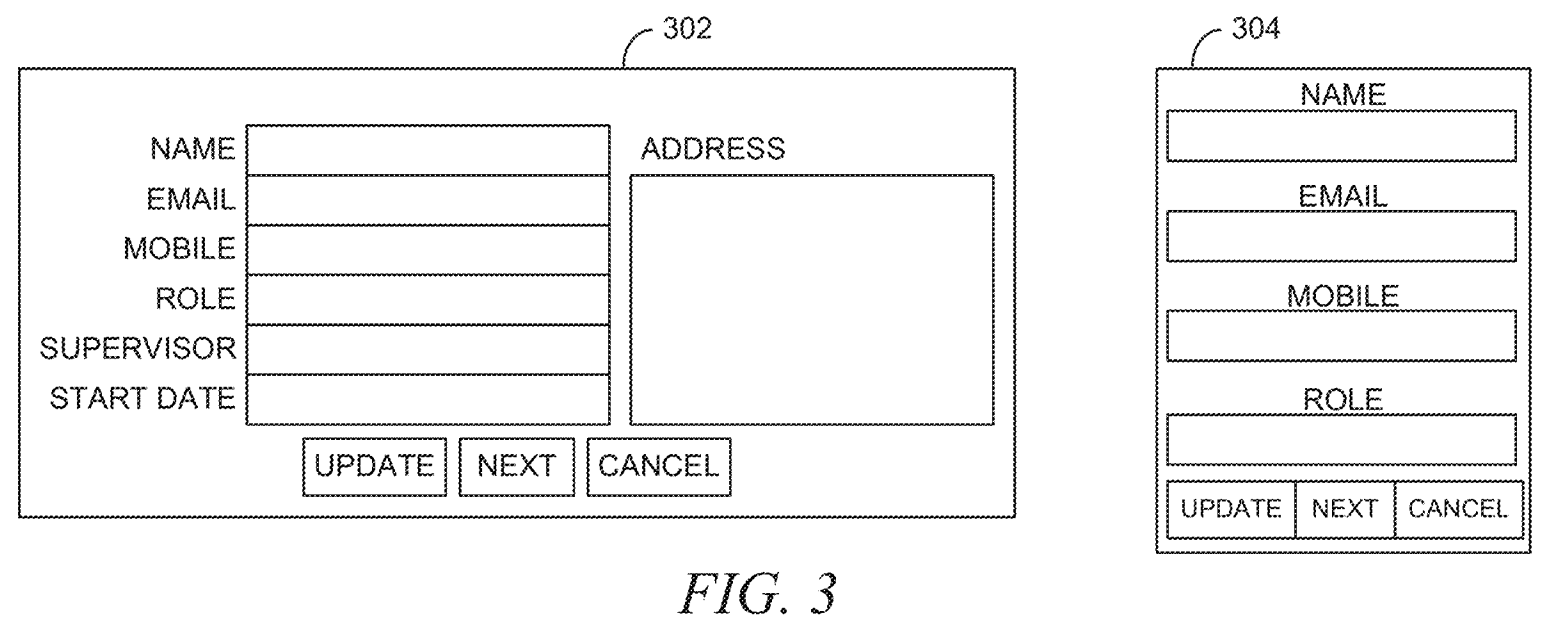

FIG. 3 illustrates an application user interface 302 from which user interface elements are copied to a mobile app user interface 304 being authored, according to an example embodiment. The user interface 302 is an example of a user interface that may be presented as part of a thick-client application. The user interface 304 is an example of the secondary user interface described above that is presented when a thick-client application is placed in the recording mode. The user may select various user interface 302 elements while in the recording mode and they will be copied into the user interface 304. When the user interface elements are copied to the user interface 304, the user interface elements may be copied in an exact form as they are presented in the source user interface 302. The user interface 304 illustrates only a select number of user interface elements selected from the source user interface 302 that have been copied. These copied user interface elements have been rearranged to form the current view of the user interface 304. Note that all of the user interface elements within the user interface 304 have been rearranged and the text box user interface elements have been resized. Further changes can be made as well, such as with regard to sizes, colors, fonts, and other properties. As the user interface elements are copied to and manipulated within the user interface 304, associations of the user interface elements back to the user interface elements of the source user interface 302 are maintained.

In some embodiments, the copying of the user interface elements is possible as the code underlying the thick-client application of the user interface 302 is a non-complied code, such as ABAP, JAVA® Script, and the like. This allows for copying of user interface, user interface element, data association, and functional code as needed. However, other embodiments may be implemented with regard to other code form types with additional programming added to facilitate the associations within an authored user interface template.

Figure 4:
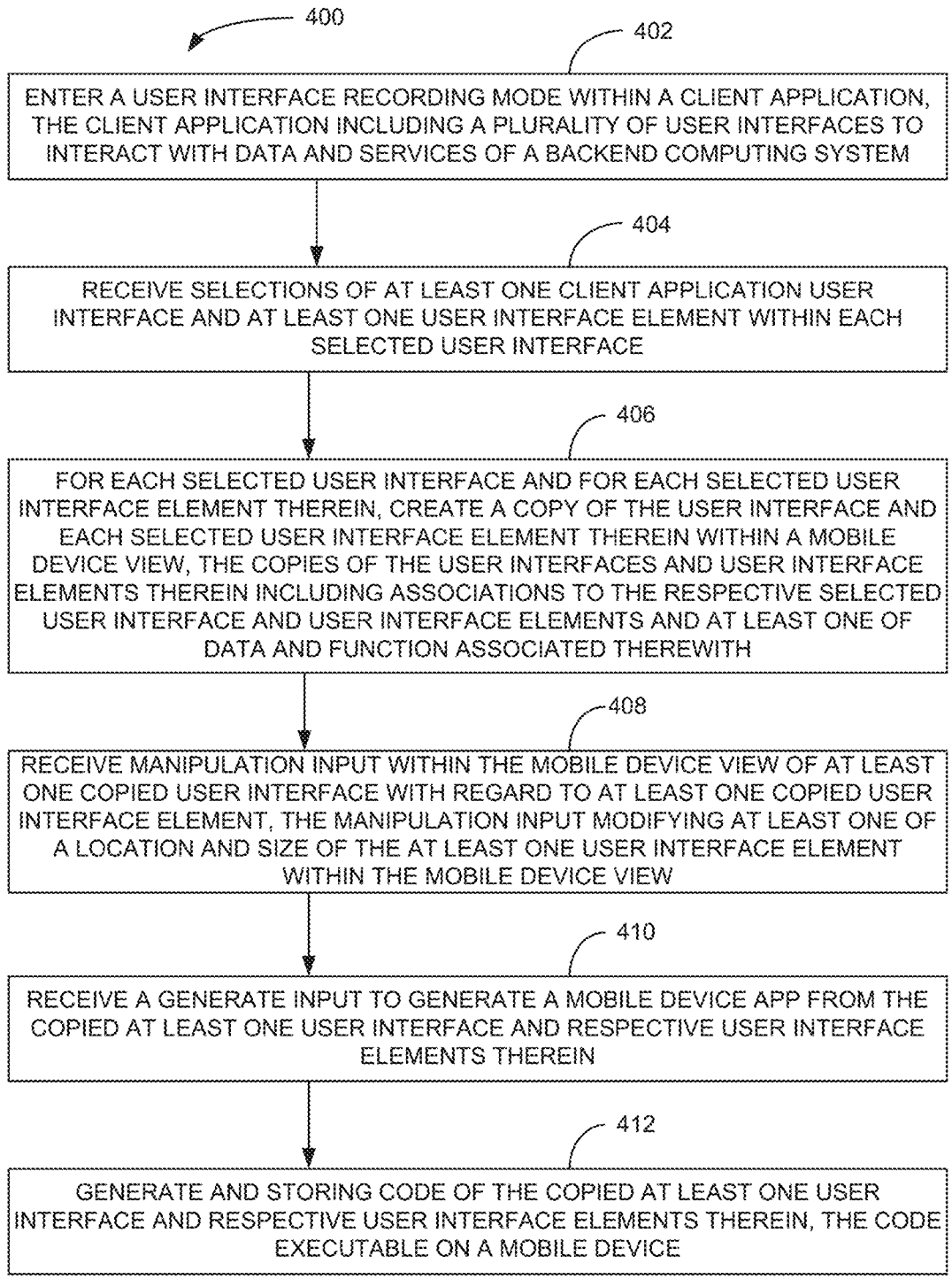
FIG. 4 is a block flow diagram of a method, according to an example embodiment.

FIG. 4 is a block flow diagram of a method 400, according to an example embodiment. The method 400 is an example of a method that may be performed when authoring a user interface template, such as within a thick-client application, or in a web-based application in some embodiments.

The method 400 includes entering 402 a user interface recording mode within a client application. The client application may include a plurality of user interfaces to interact with data and services of a backend computing system. The method 400 further includes receiving 404 selections of at least one client application user interface and at least one user interface element within each selected user interface.

After receiving 404 the selections, for each selected user interface and for each selected user interface element therein, the method 400 includes creating 406 a copy of the user interface and each selected user interface element therein within a mobile device view, such as the secondary user interfaces described above. The copies of the user interfaces and user interface elements therein will include associations to the respective selected user interface and user interface elements and at least one of data and function associated therewith.

The method 400 also includes receiving 408 manipulation input within the mobile device view of at least one copied user interface with regard to at least one copied user interface element. The manipulation input is received 408 to modify at least one of a location and size of the at least one user interface element within the mobile device view. Once the manipulation input has been received 408, the method 400 may then receive 410 a generate input to generate a user interface template or a mobile device app from the copied at least one user interface and respective user interface elements therein. The method 400 may then generate 412 and store code of the copied at least one user interface and respective user interface elements therein in the form of a user interface template or a mobile device app. The code of such embodiments is executable on a mobile device, such as within a mobile device app.

In some embodiments of the method 400, the generated code may be a user interface template and includes a copy of code elements from the client application that are executable within an execution environment within an app that executes on the mobile device. The generated code, when executed on the mobile device app, typically presents the selected user interfaces and respective user interface elements to allow user interaction therewith and interacts with the data and services of the backend computing system in response the user interaction. When the mobile device app executes in some such embodiments, the mobile device app establishes a data communication session with a presentation server process and the presentation server process establishes and maintains a stateful session with the backend computing system on behalf of a device app.

Figure 5:
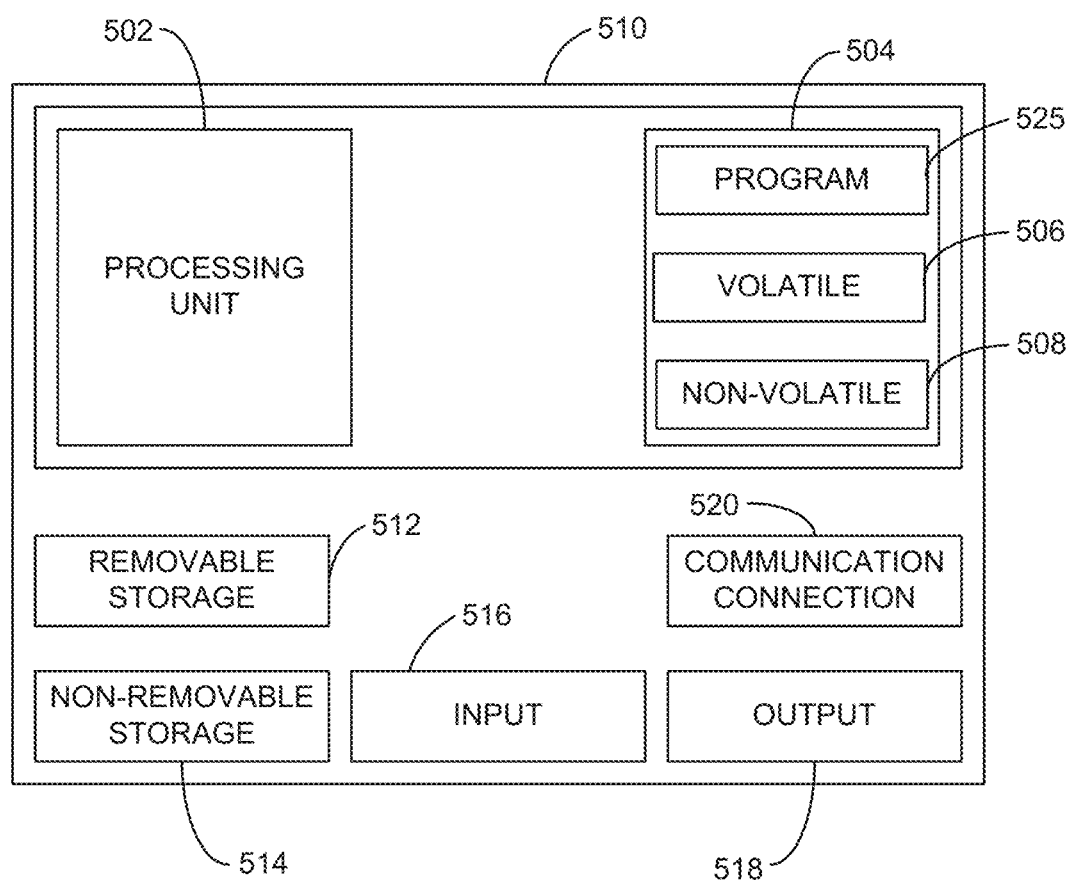
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, smartwatch, or other computing device including the same or similar elements as illustrated and described with regard to FIG. 5. Devices such as smartphones, tablets, and smartwatches are generally collectively referred to as mobile devices. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 510 may include or have access to a computing environment that includes input 516, output 518, and a communication connection 520. The input 516 may include one or more of a touchscreen, touchpad, mouse, keyboard, camera, one or more device-specific buttons, one or more sensors integrated within or coupled via wired or wireless data connections to the computer 510, and other input devices. The computer 510 may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 520 may also or alternatively include a transceiver device, such as a BLUETOOTH® device that enables the computer 510 to wirelessly receive data from and transmit data to other BLUETOOTH® devices.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs 525 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   entering a user interface recording mode within a client application, the client application including a plurality of user interfaces to interact with a backend computing system;
   receiving a selection of a first client application user interface;
   receiving a selection of a first user interface element within the first client application user interface, wherein the first user interface element is to interact with a first service of the backend computing system;
   copying the first client application user interface within a mobile device view to generate a copied first user interface;
   copying the first user interface element within the mobile device view to generate a copied first user interface to interact with the first service of the backend computing system, wherein the copied first user interface element comprises:
   an association to the first user interface element; and
   an association to at least one of data associated with the first user interface element or a function associated with the first user interface element;
   receiving manipulation input within the mobile device view of the copied first user interface with regard to the copied first user interface element, the manipulation input indicating a modification to at least one of a location or a size of the copied first user interface element within the mobile device view to the first user interface element;
   receiving a generate input to generate a mobile device app from the copied first user interface and the copied first user interface element therein;
   generating and storing code of the copied first user interface and the first copied user interface element therein, wherein the code describes the modification and wherein the code is executable on a mobile device to interact with the first service of the backend computing system via an emulator executing the first client application user interface.

2. The method of claim 1, wherein the generated code includes a copy of code elements from the client application that are executable within an execution environment within an app that executes on the mobile device.

3. The method of claim 1, wherein when the mobile device app executes:
   the mobile device app establishes a data communication session with a presentation server process via the emulator; and
   the presentation server process establishes and maintains a stateful session with the backend computing system on behalf of a device app.

4. The method of claim 1, wherein the selection of the first client application user interface includes a selection of a second client application user interface presented by the client application in response to receipt of input within the first client application user interface.

5. The method of claim 1, wherein the generating and the storing code of the copied first user interface and the first copied user interface elements therein includes generating a code representation of the copied first user interface in the form of a presentation template that includes mappings between the copied first user interface and the copied first user interface element and the first service of the backend computing system.

6. The method of claim 1, wherein receiving manipulation input further comprises receiving input that adjusts formatting of the copied first user interface element.

7. A non-transitory computer-readable medium, with instructions stored thereon, which when executed by at least one processor of a computing device, cause the computing device to perform data processing activities comprising:
   entering a user interface recording mode within a client application, the client application including a plurality of user interfaces to interact with a backend computing system;
   receiving a selection of a first client application user interface;
   receiving a selection of a first user interface element within the first client application user interface, wherein the first user interface element is to interact with a first service of the backend computing system;

copying the first client application user interface within a mobile device view to generate a copied first user interface;

copying the first user interface element within the mobile device view to generate a copied first user interface element to interact with the first service of the backend computing system, wherein the copied first user interface element comprises:

an association to the first user interface element; and an association to at least one of data associated with the first user interface element or a function associated with the first user interface element;

receiving manipulation input within the mobile device view of the copied first user interface with regard to the copied first user interface element, the manipulation input indicating a modification to at least one of a location or a size of the copied first user interface element within the mobile device view relative to the first user interface element;

receiving a generate input to generate a mobile device app from the copied first user interface and the copied first user interface element therein;

generating and storing code of the copied first user interface and the first copied user interface element therein, wherein the code describes the modification and wherein the code is executable on a mobile device to interact with the first service of the backend computing system via an emulator executing the first client application user interface.

8. The non-transitory computer-readable medium of claim 7, wherein the generated code includes a copy of code elements from the client application that are executable within an execution environment within an app that executes on the mobile device.

9. The non-transitory computer-readable medium of claim 7, wherein when the mobile device app executes:

the mobile device app establishes a data communication session with a presentation server process via the emulator; and the presentation server process establishes and maintains a stateful session with the backend computing system on behalf of a device app.

10. The non-transitory computer-readable medium of claim 7, wherein the selection of the first client application user interface includes a selection of a second user interface presented by the client application in response to receipt of input within the first client application user interface.

11. The non-transitory computer-readable medium of claim 7, wherein the generating and the storing code of the copied first client application user interface and the copied first user interface elements therein includes generating a code representation of the copied first user interface in the form of a presentation template that includes mappings between the copied first user interface and the copied first user interface element and data and the first service of the backend computing system.

12. The non-transitory computer-readable medium of claim 7, wherein receiving manipulation input further comprises receiving input that adjusts formatting the copied first user interface element.

13. A system comprising: at least one processor; at least one processor; at least one input device; at least one display device; and an instruction set accessible in the memory and executable by the at least one processor to perform data processing activities, the data processing activities comprising:

entering a user interface recording mode within a client application, the client application including a plurality of user interfaces to interact with a backend computing system, the user interfaces presented on the at least one display device;

receiving, via the at least on input device, a selection of a first client application user interface;

receiving, via the at least on input device, a selection of a first user interface element within the first client application user interface, wherein the first user interface element is to interact with a first service of the backend computing system;

copying the first client application user interface within a mobile device view to generate a copied first user interface;

copying the first user interface element within the mobile device view to generate a copied first user interface to interact with the first service of the backend computing system, wherein the copied first user interface element comprises:

an association to the first user interface element; and an association to at least one of data associated with the first user interface element or a function associated with the first user interface element;

receiving, via the at least on input device, manipulation input within the mobile device view of the copied first user interface with regard to the copied first user interface element, the manipulation input indicating a modification to at least one of a location or a size of the copied first user interface element within the mobile device view to the first user interface element;

receiving, via the at least on input device, a generate input to generate a mobile device app from the copied first user interface and the copied first user interface element therein;

generating and storing code of the copied first user interface and the first copied user interface element therein, wherein the code describes the modification and wherein the code is executable on a mobile device to interact with the first service of the backend computing system via an emulator executing the first client application user interface.

14. The system of claim 13, wherein the generated code includes a copy of code elements from the client application that are executable within an execution environment within an app that executes on the mobile device.

15. The system of claim 13, wherein when the mobile device app executes:

the mobile device app establishes a data communication session with a presentation server process via the emulator; and the presentation server process establishes and maintains a stateful session with the backend computing system on behalf of a device app.

16. The non-transitory computer-readable medium of claim 13, wherein the selection of the first client application user interface includes a selection of a second client application user interface presented by the client application in response to receipt of input within the first client application user interface.

17. The system of claim 13, wherein the generating and the storing code of the copied first user interface and the first copied user interface elements therein includes generating a code representation of the copied first user interface in the form of a presentation template that includes mappings between the copied first user interface and the copied first user interface element and the first service of the backend computing system.

* * * * *